US005914711A

United States Patent [19]

Mangerson et al.

[11] Patent Number: 5,914,711

[45] Date of Patent: Jun. 22, 1999

[54] METHOD AND APPARATUS FOR BUFFERING FULL-MOTION VIDEO FOR DISPLAY ON A VIDEO MONITOR

[75] Inventors: Mark M. Mangerson, LeMars, Iowa; Randall S. Farwell, Dakota Dunes, S. Dak.

[73] Assignee: Gateway 2000, Inc., North Sioux City, S. Dak.

[21] Appl. No.: 08/638,769

[22] Filed: Apr. 29, 1996

[51] Int. Cl.[6] .......... H04N 7/12

[52] U.S. Cl. .......... 345/203; 345/507; 345/508

[58] Field of Search .......... 345/185, 189, 345/201, 507, 508, 203; 348/441, 448, 422; 395/118, 501, 507–509, 512

[56] References Cited

U.S. PATENT DOCUMENTS

| | | | |
|---|---|---|---|
| 4,698,674 | 10/1987 | Bloom | 358/140 |
| 4,719,509 | 1/1988 | Sakamoto | 358/112 |
| 4,814,873 | 3/1989 | Maekawa | 358/140 |
| 4,855,813 | 8/1989 | Russell et al. | 358/22 |
| 4,862,269 | 8/1989 | Sonoda et al. | 358/160 |
| 4,994,912 | 2/1991 | Lumelsky et al. | 358/140 |
| 5,053,864 | 10/1991 | Thompson | 358/22 |
| 5,249,164 | 9/1993 | Koz | 358/21 R |
| 5,274,753 | 12/1993 | Roskowski et al. | 395/135 |
| 5,291,275 | 3/1994 | Lamelsky | 348/441 |
| 5,347,322 | 9/1994 | Levine et al. | 348/718 |
| 5,402,147 | 3/1995 | Chen et al. | 345/115 |
| 5,461,679 | 10/1995 | Normile et al. | 382/304 |
| 5,473,383 | 12/1995 | Sezan et al. | 348/452 |
| 5,519,449 | 5/1996 | Yanai et al. | 348/598 |
| 5,534,936 | 7/1996 | Kim | 348/448 |
| 5,557,302 | 9/1996 | Levinthal et al. | 345/189 |
| 5,557,332 | 9/1996 | Koyanagi et al. | 398/416 |
| 5,594,467 | 1/1997 | Marlton et al. | 345/115 |
| 5,633,687 | 5/1997 | Bhayani et al. | 348/441 |
| 5,668,599 | 9/1997 | Cheney et al. | 348/409 |

*Primary Examiner*—Jeffery Brier
*Assistant Examiner*—Vincent E. Kovalick
*Attorney, Agent, or Firm*—Schwegman, Lundberg, Woessner & Kluth, P.A.; Anthony Claiborne

[57] ABSTRACT

Triple-buffering video memory in a computer graphics controller improves the quality of full-motion video converted for display on a computer monitor. Buffer size, organization, and access cycles prevent converted data representing a new video frame from overwriting a buffer in memory that contains converted data representing a video frame currently being displayed. The access cycles also ensure all data representing a video frame is displayed. The video memory is partitioned into three logical buffers to hold the converted data, the buffers are arranged in a logical ring sequence for read and write access, and the data in a buffer is repeatedly read until the next buffer in the sequence is full of data and ready to be read. In addition, the buffering is adaptable to different resolutions as the size of the buffers is determined by the value of the resolution each time the video conversion is initiated.

13 Claims, 6 Drawing Sheets

METHOD AND APPARATUS FOR BUFFERING FULL-MOTION VIDEO FOR DISPLAY ON A VIDEO MONITOR

FIELD OF THE INVENTION

The present invention is related to personal computers and in particular to displaying full-motion video on a personal computer monitor.

BACKGROUND OF THE INVENTION

Multimedia personal computers are capable of displaying television and other full-motion video on a standard VGA-type monitor. However, the present technology used in the supporting video cards is unsatisfactory. Picture quality is poor because of the difference between interlaced television/video images and non-interlaced VGA images, and between video stream input rates and monitor output display rates.

A television video image or "frame" is composed of a number of lines of picture data with the odd numbered lines making up one "field" while the even numbered lines make up a second field. The fields are captured separately by the video camera; if the object moves between the scans of the first field and the second field the image will be displaced in location between the fields. The frame is output by displaying the odd numbered lines in the first field and then the even numbered lines in the second field, a technique known as "interlacing". Television or other monitors capable of handling such a display are referred to as interlaced monitors. Televisions, in particular, are manufactured with high-persistence phosphor screens calibrated to work with the human eye's ability to act as a vision filter by preserving the image of one field long enough for the eye to register it and then allowing the image to fade before the image of the next field is displayed thus making the displacement of the object between the two fields unnoticeable.

An interlaced frame can be displayed on a non-interlaced monitor by merging the fields into a single image so that all the picture lines are displayed at the same time. However, an object in motion then appears to be torn or skewed since it appears at different locations in the lines of the two fields. In addition, parts of the object may vanish and reappear, producing what is known in the art as "motion artifacts". On a low-persistence phosphor monitor, such as the majority of computer monitors in use today, motion artifacts can be reduced by displaying the video output in interlaced format at the highest possible output display, or scan, rate. An interlaced scan rate of 120 Hz provides the equivalence of a 60 Hz non-interlaced scan rate which eliminates many of the artifacts.

However, increasing the scan rate of the monitor introduces another type of defect. Standard video is input to the monitor at the NTSC (National Television System Committee) television rate of 30 Hz, or 30 frames a second. A monitor with a 72 Hz non-interlaced scan rate "refreshes" the image on the screen at a rate of 72 frames a second. Because the output rate is asynchronous relative to the input rate, the output scan rate periodically gets "out-of-sync" with the input capture rate and the monitor displays an image that mixes the previously-output frame with the incoming frame.

One solution to the mixing of images is to synchronize the input and the output rates, referred to in the art as "genlocking", so that the output display rate is an integer multiple of the input capture rate. For example, a monitor with a 72 Hz display rate genlocked in a one-to-one relationship with the input capture rate receives 30 frames a second and displays each frame it is received; a two-to-one genlock would permit the monitor to run at 60 Hz. The higher the genlock ratio, the greater the permitted scan rate and the greater the reduction in motion artifacts. However, genlocking requires the addition of a timing circuit to enforce the synchronization which adds expense and complexity to a graphics controller implementing a genlock solution.

Another way to resolve the problem of intermixed frames at high scan rates is to save the last frame in a memory so that the monitor can display the same frame more than once. Most computer graphics controller subsystems in use today incorporate such memory, called a frame buffer. Using a frame buffer, however, is not a complete solution. If the memory can hold only a single frame of video, information in the buffer being displayed is periodically overwritten with input data, producing a sparkling effect in the image.

Other proposals use two frame buffers so that one buffer is being displayed while the other is being filled with input data. However, this approach only works when the output display rate is less than or equal to twice the input capture rate. Otherwise, the output display rate periodically "overtakes" the input capture rate and begins displaying data from a buffer as it is being filled, again causing the image to sparkle. Since current monitor display rates range from 75 Hz to 90 Hz and above, double buffering has limited value.

U.S. Pat. No. 5,402,147 to Chen et al., describes a dual buffer approach with a third, overflow, buffer that is smaller than the two frame buffers. Input data received before either frame buffer is ready for new data is written into the overflow buffer. When the data in one frame buffer has been displayed, the data in the overflow buffer is transferred to that frame buffer. The success of this method requires precisely determining the amount of overflow data to be captured, and careful timing of the transfer between the overflow and frame buffers, or the overflow buffer itself will overflow. In addition, an apparatus using this method is configured for a single output display rate and cannot be easily adapted to different output display rates because of the critical nature of the transfer timing.

Other inventions use more than two buffers but distribute the data for a single image among the buffers. Distributing the data allows manipulation of portions of the image prior to display (shrinking it, merging it with other data, or displaying it in a "window" on the screen) but requires complex timing circuits to manage writing and reading the data distributed among the buffers.

What is needed, then, is a general buffering solution that solves the video quality problems for multiple output display rates, and permits the monitor to operate asynchronously from the input capture rate without the need for complex timing algorithms.

SUMMARY OF THE INVENTION

Triple-buffering video memory in a computer graphics subsystem improves the quality of full-motion video images converted for display on a computer monitor. Buffer size, organization, and access cycles prevent a new image from overwriting a buffer in memory containing the image currently being displayed, and prevent the reading of a buffer in memory for output which has not been completely filled with an image, regardless of the monitor display rate and without the use of complex timing algorithms.

Each buffer in memory holds a screen's worth of image data (a "display block") resulting from the conversion of a video frame from the input stream into pixel data suitable for display on a computer monitor. The monitor's resolution at the start of the video conversion determines the size of the display block, and thus the size of each buffer.

The buffers are arranged in a logical ring which is accessed in pre-determined sequences to read and write each buffer in turn and to wrap to the first buffer in the sequence when the last buffer has been accessed. Each buffer is repeatedly read for output until the next buffer in the read sequence is ready to be read to prevent the read sequence from overtaking the write sequence. Furthermore, partial output blocks that could garble the image on the monitor are avoided by not reading from the next buffer until all data in the display block currently being displayed has been read from its buffer.

For example, the first display block is written into a first buffer. The logic then loops through the buffer sequences until the last display block in the video stream has been read and entirely displayed on the monitor. The loop continuously reads the entire display block in the first buffer for output while data is being written into a second buffer until the second buffer is full. When the second buffer is full, the entire display block in the second buffer is continuously read while a third buffer is written until the third buffer is full. The third buffer is then continuously read while data is written into the first buffer. When the first buffer is full, the loop begins again.

In one embodiment, the display block is stored in the buffers as an interlaced image wherein the data corresponding to the odd picture lines (the first field) of a video frame is written into a first segment of the buffer, and the data corresponding to the even picture lines (the second field) of the frame is written into a second segment. The display block thus stored is output as an interlaced image by reading the first segment and then the second segment, i.e. reading the buffer sequentially from top to bottom. In another embodiment, the invention further partitions each buffer into a plurality of display lines corresponding to video "scan" lines on the monitor and then alternates reading a display line from the first segment with a display line from the second segment. This embodiment produces a non-interlaced video frame on the monitor from the interlaced data in the buffer.

In still another embodiment, each buffer is partitioned into alternating first and second pluralities of display lines (corresponding to odd and even scan lines), and the display block is first written into the first plurality (the first field) and then to the second (the second field), thus storing an interlaced display block in non-interlaced form. This display block can then be read out in non-interlaced form by reading each display line as it occurs in the buffer, or alternatively, in interlaced form by reading the first plurality of display lines and then the second plurality.

Thus, the current invention applies triple-buffering to solve the outstanding video quality problems of motion defects and sparkling images. The buffering organization and access cycles enables asynchronous operation of a monitor with a display output rate different from the input capture rate of the video stream without the need for complex timing algorithms. Furthermore, the flexibility of the buffering provides support for multiple output display rates and multiple screen resolutions on the same monitor.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds and thousands digits corresponding to the figure number, with the exception that identical components which appear in multiple figures are identified by the same reference numbers. Signals and connections may be referred to by the same number or label, and the actual meaning should be clear from the context of use.

The embodiments below are described in terms of a software program that controls access to memory in a computer graphics subsystem. It will be apparent to one skilled in the art, however, that this is only one of several possible implementations of the invention. Alternate embodiments include embedding the logic flow in a microcoded processor, executing it as a software program in the central processing unit of the computer, or creating a state machine with states determined by the results of the decision blocks in the logic flow.

Figure 1:
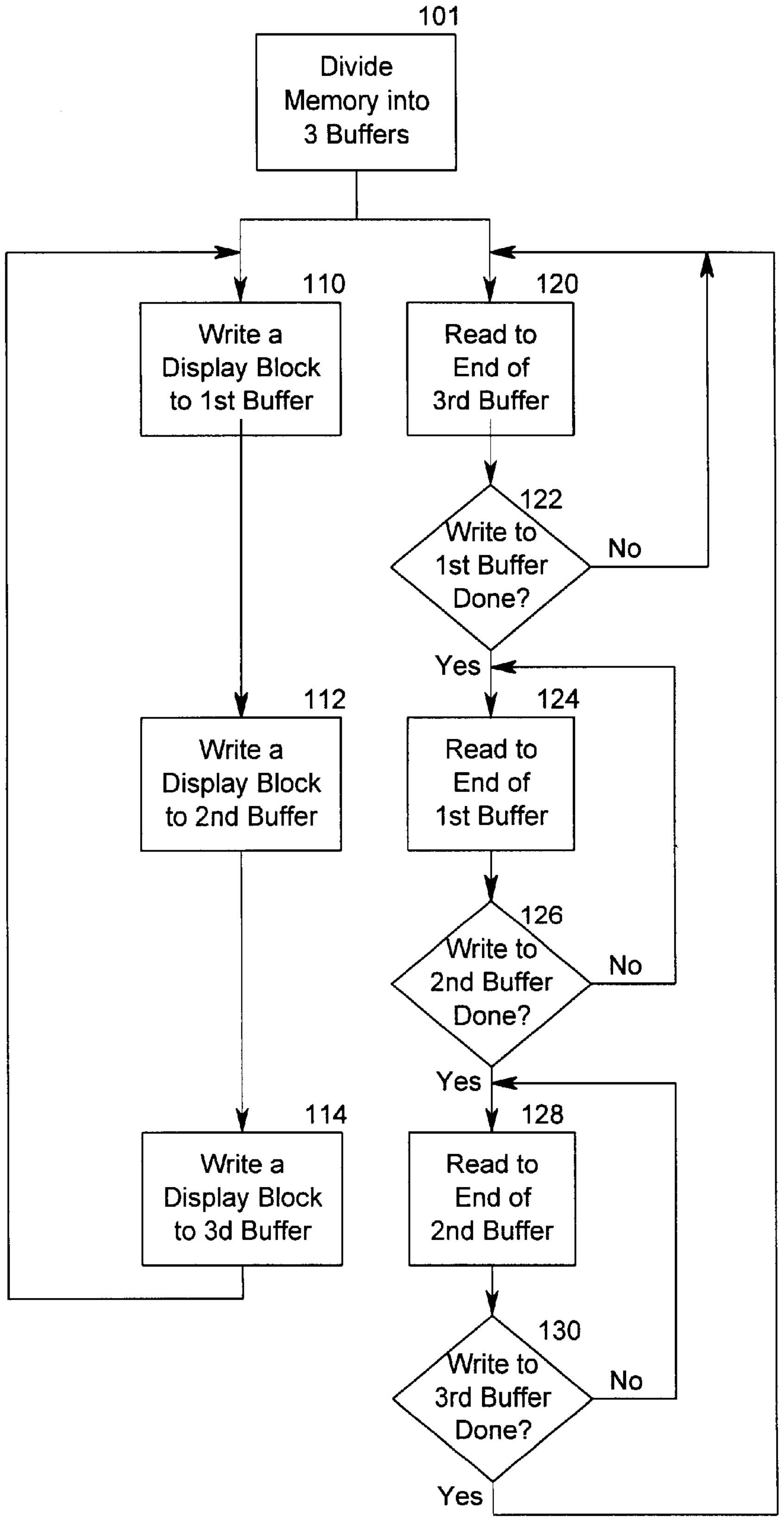
FIG. 1 is a flow diagram showing read and write cycles of the invention and the basic interactions between them.

FIG. 1 is a flow diagram of the steps of one embodiment of the invention as it is implemented in a standard computer graphics controller equipped with video memory. Frames in an incoming video stream are converted into a series of display blocks by video conversion circuitry, either added onto the graphics controller or integrated into it (as in the BtV MediaStream from Brooktree Corporation). Each display block contains computer monitor-compatible pixel data equal to one frame of the video stream.

The display blocks are written during write cycles into logical buffers in the video memory for temporary storage until read during read cycles for display on the monitor. In the embodiments shown in FIGS. 1 and 2, the video memory is partitioned into three logical buffers the addressing strategy of the invention arranged in a ring sequence so that the first buffer in memory is accessed after the last buffer in memory. The write cycles (starting at block 110 in FIG. 1 and block 130 in FIG. 2) and the read cycles (starting at block 120 in FIG. 1 and block 2400 in FIG. 2) operate asynchronously from one another to support the differences in the rates of frame input (capture) and output (display). Because the read and the write cycles are not synchronized, the read cycle must ensure it is not reading from a buffer before a display block has been completely written therein. The read cycle must also read an entire display block before moving onto the buffer containing the next display block to avoid outputting a partial display block.

To accomplish these goals, the read cycle and the write cycle follow logical sequences through the buffers that are offset by at least one so that the write cycle and the read cycle are not operating on the same buffer simultaneously. In the embodiments shown in FIGS. 1 and 2, the offset is one and the read cycle "chases" the write cycle around the ring of buffers. The use of other offsets, and a data flow in which the read cycle "leads" the write cycle, will be apparent to those skilled in the art. If the read cycle has read the entire contents of a buffer (the "current" buffer) and the write to the next buffer in the ring following the current buffer is not complete, the read cycle re-reads the current buffer. Once the write to the next buffer is complete, the read cycle begins reading that buffer, but only if the display block in the current buffer has been completely read.

Figure 2:
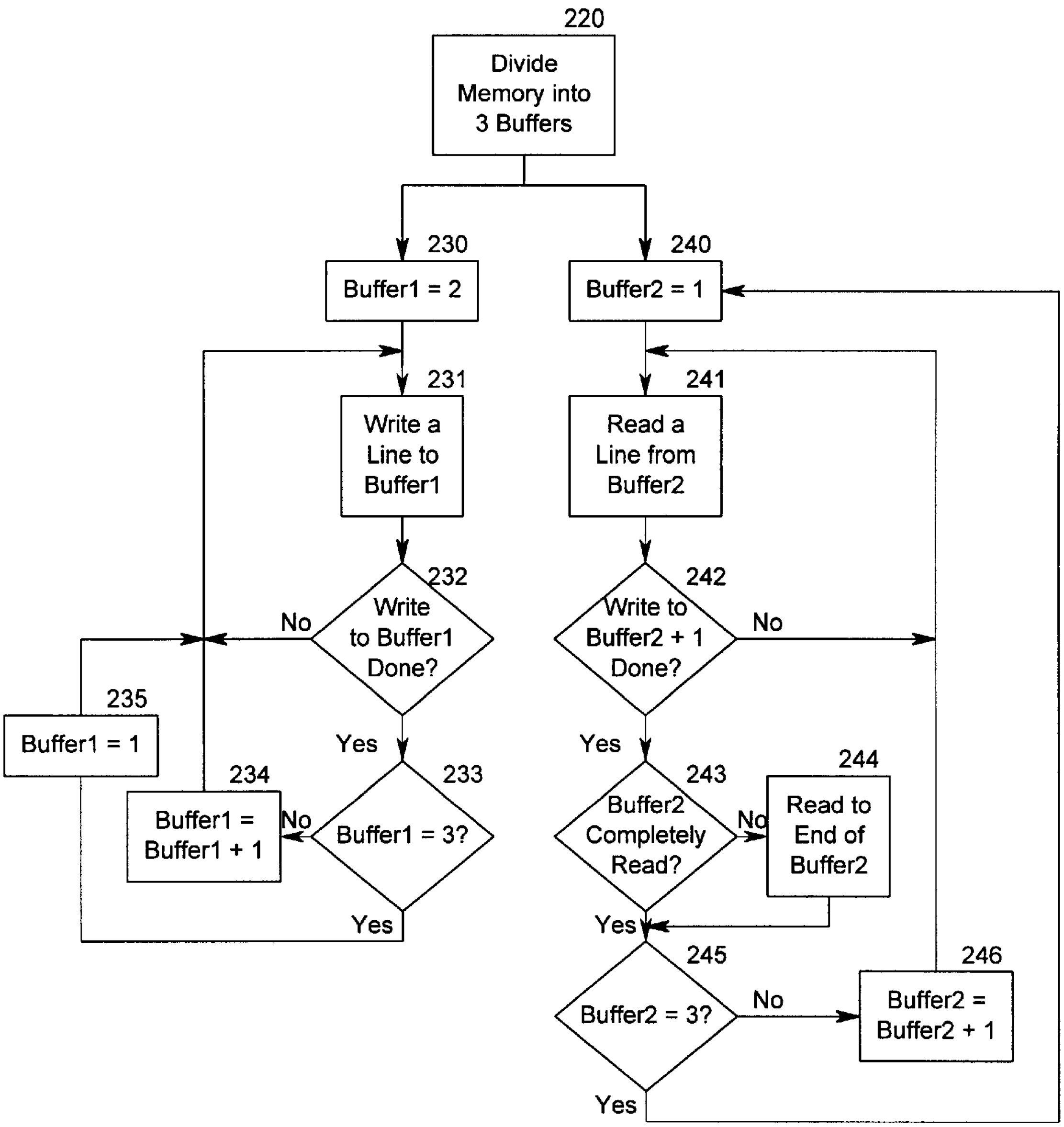
FIG. 2 is a flow diagram of an alternate embodiment of the invention using a different timing methodology for the read and write cycles.

The test for a completed write of the next buffer can occur during the read of the current buffer or only after the current buffer is completely read. A partial read can be defined as reading a display line, where each display line represents a picture line in the frame, or reading a pre-determined number of display lines in the buffer. If the write-complete test is made during the read of the current buffer and the test is true, then the read cycle reads the remainder of the current buffer without further testing and moves to the next buffer immediately after reading the last display line. If the write-complete test is made only after the last display line has been read and the test is true, the read cycle moves immediately onto the next buffer. But if the write-complete test is not true in this instance, the entire display block in the current buffer is read again before the test is repeated. Both approaches guarantee the read cycle does not output a partial display block but the necessary timing is different. FIG. 1 illustrates a logic flow in which the write-complete test is performed after reading the last display line in the current buffer. FIG. 2 illustrates a logic flow in which the write-complete test is performed after each display line is read from the current buffer.

In the initialization phase of the embodiment shown in FIG. 1, video memory is partitioned into three buffers with each buffer sized to hold a display block (block 101) as determined by the resolution of the monitor at the time the video capture is initiated. The monitor resolution can be determined by querying the monitor for its present settings, using a protocol such as disclosed in the Display Data Channel standard developed by the Video Electronics Standards Association. The write cycle (blocks 110, 112 and 114) writes a display block into each buffer in turn until all the display blocks derived from the video stream have been written. Simultaneously, and asynchronously, the read cycle represented by blocks 120, 122, 124, 126, 128 and 130 reads display blocks from the memory buffers. In the embodiment shown in FIG. 1, the test for a completed write (blocks 122, 126 and 128) is performed only after an entire display block has been read from a buffer (blocks 120, 124 and 128), although it could be performed after the read of each display line, as shown in FIG. 2, or after a pre-determined amount of the buffer has been read. Because the write-complete test is performed only after the read of an entire display block, the display block is repeatedly read (and thus displayed on the monitor) until the next buffer in the read sequence has been completely filled with data by the write cycle, i.e., the write-complete test is true. The cyclical accessing of the buffers by the read cycle and the write cycle continues asynchronously as described until all the frames in the video stream have been completely displayed.

The embodiment described above outputs a blank frame on the monitor because the initial buffer read has no display data stored in it. Two alternate embodiments which prevent this from happening are described below and other alternate embodiments will be apparent to those skilled in the art. In one alternate embodiment, a display block read before at least one buffer has been filled with data is not output to the monitor, which prevents the output of the display block read on the first pass through the read cycle. In a second alternate embodiment, the read cycle is initiated after the write cycle has completely written a first display block to a buffer, and the read cycle begins by reading the buffer holding the first display block. Both of these alternatives prevent a blank frame from appearing on the monitor while the first display block is being written into memory. Instead, the graphic controller implementing the invention outputs the previously displayed image or an image particularly saved for this purpose, such as a "splash" screen containing vendor information.

In the embodiment illustrated in FIG. 2, the initialization phase shown at block 220 is the same as described above in conjunction with FIG. 1, block 101.

The write cycle, starting at block 230, is initialized by setting the write buffer address (buffer1) to the beginning of the second block in the memory. The logic loops through blocks 231 and 232 repeatedly to write each display block a display line at a time into the memory buffer pointed to by buffer1. When the display block has been completely written, the next buffer in the write sequence to use is determined at block 233. If buffer1 currently points to the last buffer in memory, then the write wraps around to the first buffer in memory by setting buffer1 to the address of the first buffer (blocks 235); otherwise, buffer1 is set to the address of the next buffer in the sequence (block 234). In both cases, the write cycle then repeats starting with block 231.

Simultaneously with the initialization of the write cycle, the address (buffer2) of the initial buffer for the read cycle is set to the first buffer in the sequence (block 240). After each display line is read at block 241, the logic determines if the write to the next buffer in the read sequence (buffer2+1) has been completed (block 242). If not, the write cycle reads the next display line in the buffer pointed to by buffer2 (the "current" buffer) at block 241. If the write to the next buffer in the read sequence has not been completed when the last display line in the current buffer has been read, the read cycle wraps around and reads the first display line in the current buffer at block 241. The display block in the current buffer is continuously displayed on the monitor until the next buffer in the read sequence is filled with data by the write cycle.

If the write to the next buffer in the read sequence has been completed, then a test is performed to determine the status of the read of the current buffer (block 243). If the read cycle is concurrently reading the last display line in the current buffer, then the next read in the read cycle begins with the next buffer in the read sequence (blocks 245 and 246). However, if the read cycle has not finished reading the current buffer, then all the remaining display lines in the current buffer are read (block 244) before beginning to read from the next buffer in the read sequence. As in the write cycle, the address for the buffer to read wraps to the first buffer in the read sequence if the current buffer is the last in the sequence (blocks 245 and 246).

As in the embodiment described above in conjunction with FIG. 1, the initial read of a buffer outputs a blank display block, and the same alternative embodiments that prevent this occurrence are applicable here as well.

Figure 3:
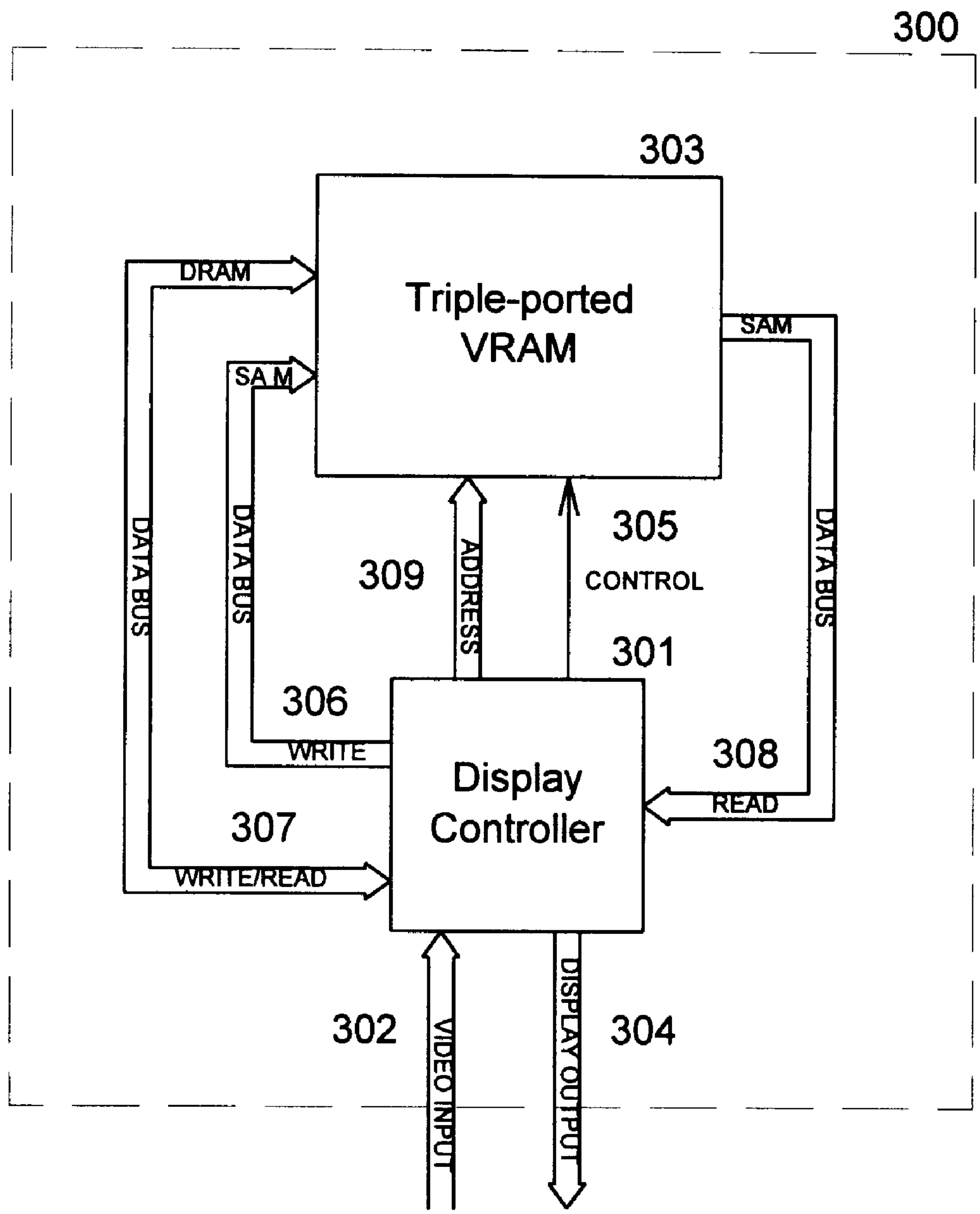
FIG. 3 is a block diagram of an embodiment of the invention using a triple-ported video random access memory.

FIG. 3 is a block diagram illustrating a physical embodiment of the present invention for controlling a personal computer monitor using a triple-ported video random access memory (VRAM) device for the memory. Graphics subsystem 300 is configured with a display controller 301 and a VRAM 303 which serves as a frame buffer for a video input 302 after processing by the display controller 301 and before being sent to the monitor as display output 304. The display controller 301 incorporates video conversion circuitry, such as the Bt819 video capture processor from Brooktree Corporation, which converts analog NTSC (National Television System Committee) or PAL (phase alternating-line) video signals to pixel data suitable for display on a computer monitor. However, the invention is not limited to NTSC or PAL video signals as the use of a different video conversion circuitry that works with other video modes, such as SECAM (sequential color with memory systems), is within the scope of this disclosure.

The VRAM 303 has three input/output ports so that the pixel data produced by the display controller 301 can be written into memory through a dynamic random access memory (DRAM) port or a sequential access method (SAM) port, and read from memory through the DRAM port or through a second SAM port. Each port can be accessed asynchronously from the other two.

In order to write data into the VRAM through the DRAM port, the display controller 301 signals the VRAM 303 on a control line 305 that it is writing data via the DRAM port, directs the data to DRAM data bus 307, and enters onto an address bus 309 the address of the location in VRAM 303 for each bit appearing on the DRAM data bus 307. Reading data from the VRAM via the DRAM port essentially reverses the process. DRAM access is particularly suited for standard computer graphics where the image does not change significantly from one screen to the next in sequence. For example, to display an icon on a monitor screen, the display controller 301 enters the addresses of the bits where the icon is to appear on the control line 305, and places the icon data on the DRAM data bus 307, and signals the VRAM on control line 305 to overwrite the icon data onto the display data already resident in memory. Additionally, DRAM access is necessary to read specified parts of the existing display data when directed by the CPU of the computer. However, the need to address each bit in a display individually renders DRAM access generally too slow for handling streams of full-motion video.

Instead, the invention uses the two SAM ports for writing and reading video data. SAM access requires that only the address of the initial bit in a sequence be entered on the address bus when reading or writing and is significantly faster. Sequential access reads or writes a single display line by loading the address of the beginning of the line on the address bus 309 and performing sequential reads or writes until all the bits comprising the display line have been accessed. In the embodiment shown in FIG. 2, SAM data bus 306 is used to write video data sequentially into VRAM 303 while SAM data bus 308 is used to read video data sequentially from VRAM 303. The reads and writes occur asynchronous from each other.

Figure 4:
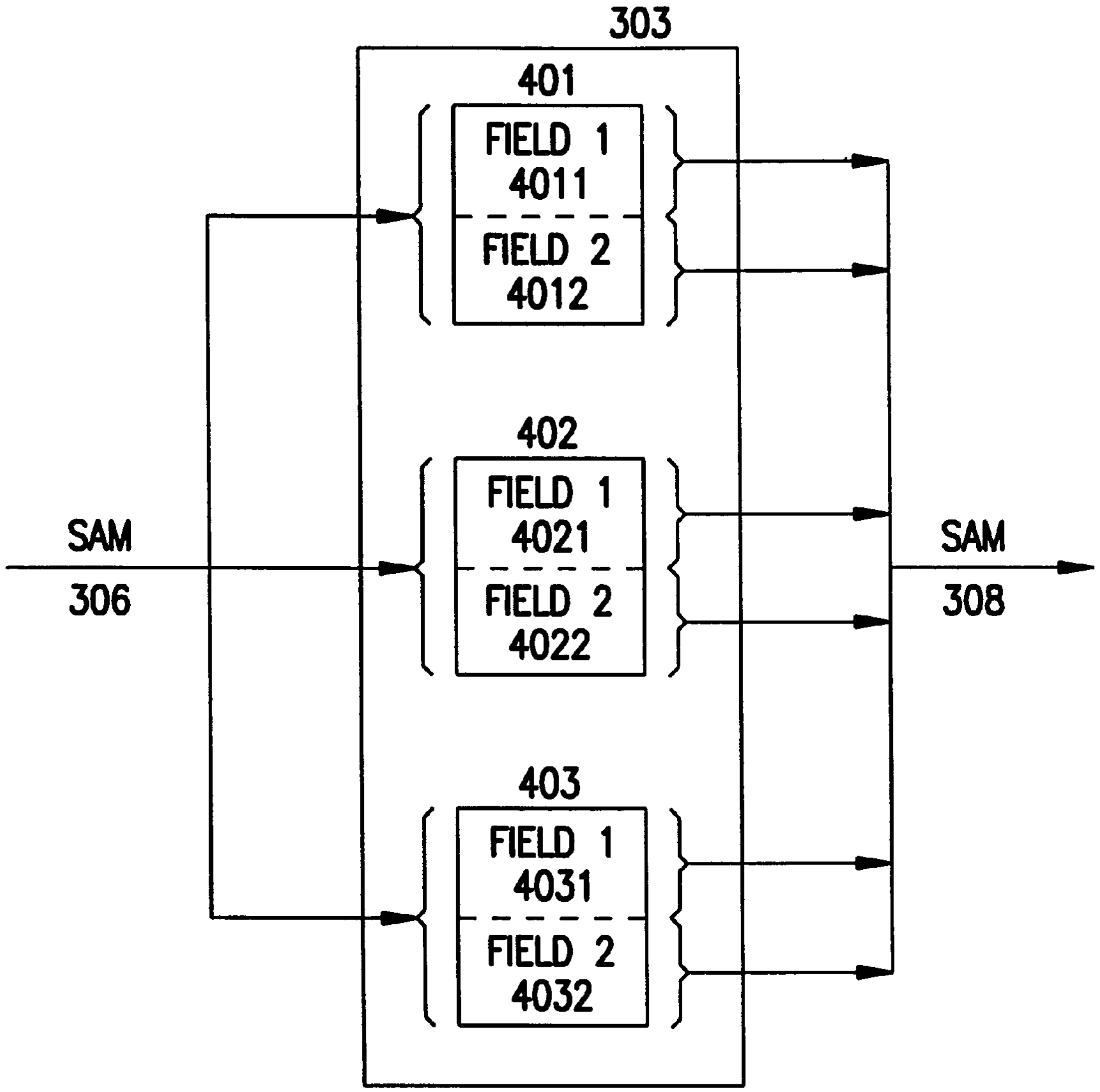
FIG. 4 is a block diagram illustrating an embodiment of the invention that outputs non-interlaced and interlaced frames from interlaced input.
Figure 5:
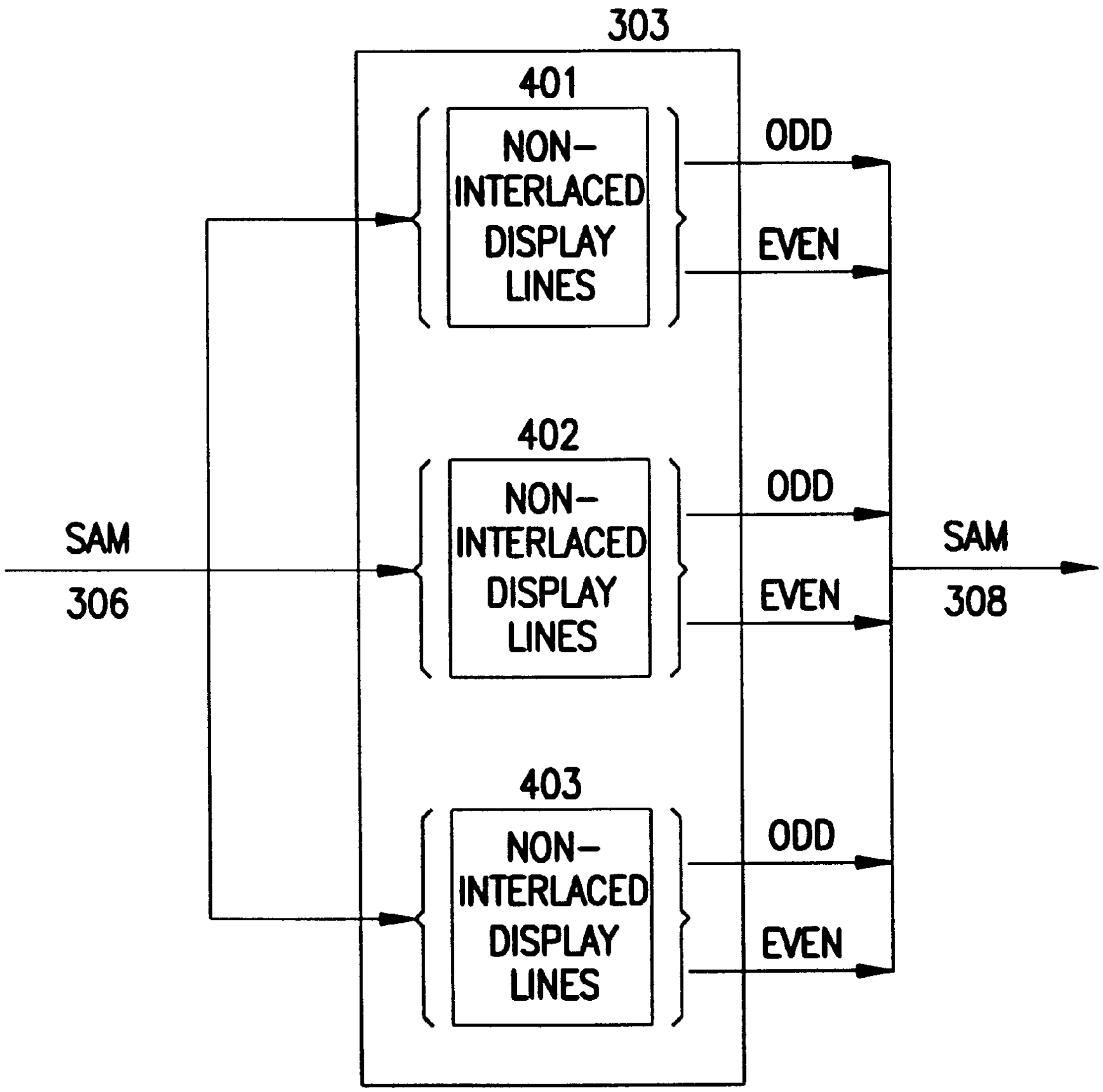
FIG. 5 is a block diagram illustrating an embodiment of the invention that stores interlaced input as non-interlaced frames and outputs interlaced and non-interlaced frames.

FIGS. 4 and 5 show alternate embodiments of the invention that implement a triple-buffering data flow as illustrated in FIG. 2 with a triple-ported VRAM as shown in FIG. 3. In both embodiments, the VRAM 303 is partitioned into three buffers (401, 402, and 403).

In the alternate embodiment shown in FIG. 4, each buffer is further partitioned into two equal segments (buffer 401 containing segments 4011 and 4012, buffer 402 containing segments 4021 and 4022, and buffer 403 containing segments 4031 and 4032). An interlaced display block is loaded onto the SAM data bus 306 so that all its odd numbered display lines (the first field) are stored in a buffer before its even number display lines (the second field). Because this is a sequential write, the first field of the display block is written into segment 4011, 4021 or 4031, and the second field is written into the corresponding second segment of the same buffer, i.e., 4012, 4022, or 4032. If the display block is to be presented to the monitor as an interlaced display block, then a normal sequential read of VRAM 303, i.e. a top to bottom read of a buffer, places interlaced data on the SAM data bus 308, starting with the first display line in the first field and ending with the last display line in the second field. FIG. 4 also shows an embodiment that outputs a non-interlaced display block from an interlaced display block stored in VRAM 303 by alternately reading the segment of the buffer holding the first field of the display block and the segment holding the second field. The address of the first display line in the first field is loaded on the address bus 309, then the address of the first display line in the second field, then the address of the second display line in the first field, then the address of the second display line in the second field, and so on until the last display line in the second field has been read.

The embodiment shown in FIG. 5 outputs an interlaced display block when the display block is stored in VRAM as non-interlaced. The display controller 301 puts data onto the SAM data bus 306 in non-interlaced form. A normal sequential read of the VRAM 303 buffer results in the display block being output non-interlaced. However, reading every other display line, starting with the first display line in the buffer, to the end of the buffer, and then reading every other display line starting with the second display line, outputs the display block interlaced.

An alternate embodiment using a dual-ported, rather than a triple-ported, VRAM would replace SAM data bus 306 in FIGS. 4 and 5 with DRAM data bus 307. The write function remains sequential but full addresses for all bits are provided to the address bus 309 instead of only a starting address for each display line. WRAM, or Windows RAM currently available from Samsung Electronics, is an adaptation of the standard dual-ported VRAM incorporating logic to make video transfers faster under the Microsoft Windows® family of operating systems and is also suitable for use in the invention. Single-ported DRAMs also can be used although the speed advantage of dual or triple porting is lost due to contention between the read and the write cycles for the single DRAM bus. Some speed can be recovered if the single-ported DRAM's used are Extended Data Out (EDO) DRAM's as memory access cycles can be overlapped, allowing more reads or writes in the same period of time.

Figure 6:
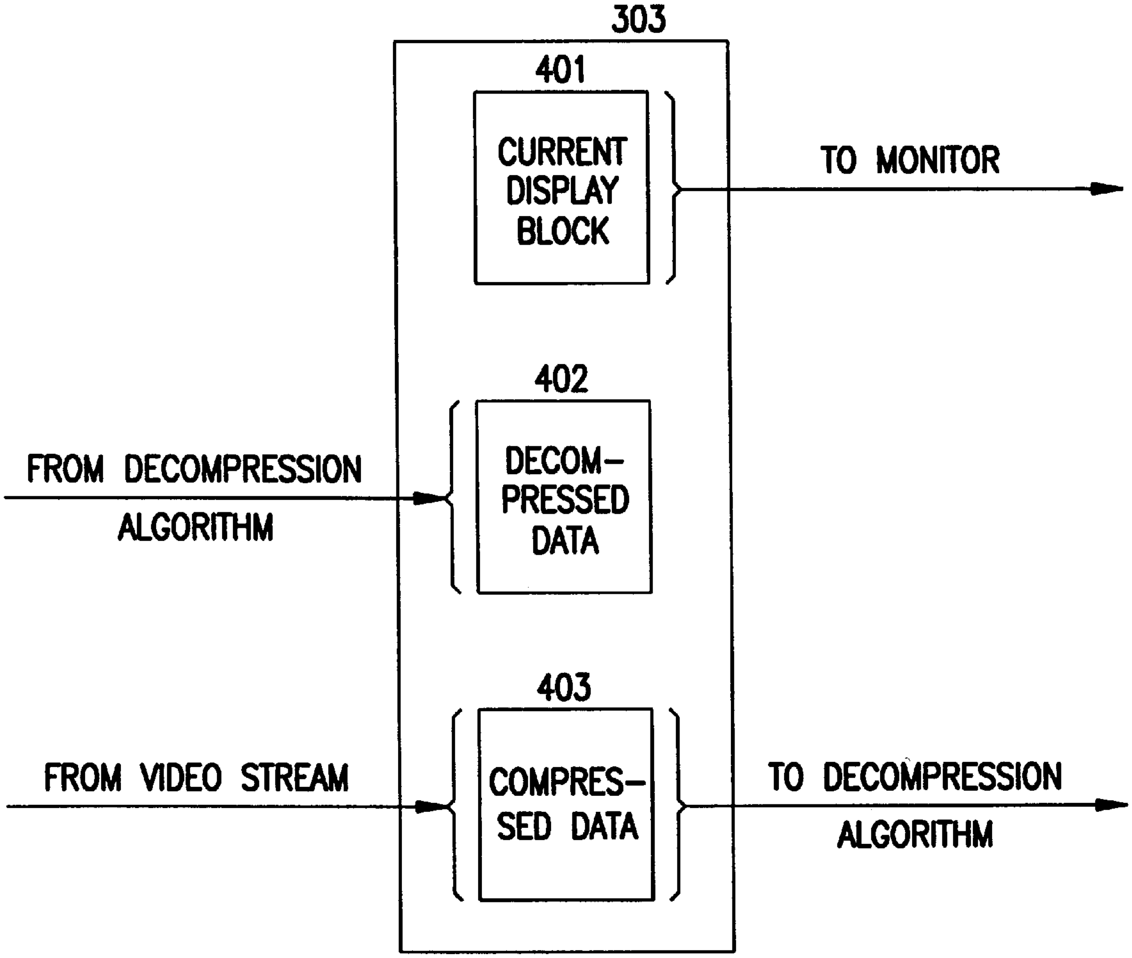
FIG. 6 is a block diagram illustrating an embodiment of the invention using three memory buffers to decompress and display compressed video frames.

Other implementations of the invention will be apparent to those skilled in the art, as will the use of alternate video memory technologies for the hardware that embodies it. Furthermore, applying multi-buffering to solve other difficulties associated with displaying full-motion video on a computer monitor are also within the scope of the invention. For example, triple-buffereing can be used to display MPEG (Motion Pictures Experts Group) or other compressed video data with the same benefits as uncompressed video. In a triple-buffer decoding implementation shown in FIG. 6, the first buffer 401 holds decompressed data representing a video frame which is being read for output while a decompression algorithm is writing decompressed data representing the next video frame to the second buffer 402. The compressed data being fed into the decompression algorithm is held in the third buffer 403. The read cycle reads the data in the first buffer 401 repeatedly, only moving to the next buffer in the sequence, buffer 402 in FIG. 6, when it is filled with decompressed data. The write cycle then uses the other two buffers, 403 and 401, to begin decompressing the next frame in the video stream by reading a compressed frame into buffer 401 and writing the decompressed data to buffer 403. The logical flow through the buffers proceeds asynchronously as in the other embodiments described above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for improving the quality of full-motion video displayed on a video monitor controlled by display processing circuitry that converts frames in a video stream into a corresponding series of display blocks and stores the display blocks in a memory for display on the monitor, the method comprising the steps of:

partitioning the memory into three logical buffers, wherein each buffer is sized to hold a display block;

writing the display block first in the series into a first buffer; and performing a storage-and-retrieval loop until the display block last in the series has been completely read, the storage-and-retrieval loop comprising the steps of:

repeatedly reading the entire display block from the first buffer while writing the next display block in the series into a second buffer until the second buffer is full;

repeatedly reading the display block from the second buffer while writing the next display block in the series into a third buffer until the third buffer is full; and repeatedly reading the display block from the third buffer while writing the next display block in the series into the first buffer until the first buffer is full.

2. The method of claim 1, further comprising the step of:

partitioning each logical buffer into first and second equal segments, wherein a first field of the display block representing odd picture lines in an interlaced frame is written into the first segment, and a second field of the display block representing even picture lines in the interlaced frame is written into the second segment to store the display block in memory as interlaced.

3. The method of claim 2, wherein reading a display block results in first the first segment and then the second segment being output such that the display block is output as an interlaced video frame.

4. The method of claim 2, wherein each buffer is further partitioned into a plurality of display lines and reading a display block alternates between reading one of the plurality of display lines in the first segment and one of the plurality of display lines in the second segment to output the display block as a non-interlaced video frame.

5. The method of claim 1, wherein each logical buffer is partitioned into alternating first and second pluralities of display lines, and writing a display block writes to each one of the first plurality of display lines and then to each one of the second plurality of display lines to store the display block in memory as non-interlaced.

6. The method of claim 5, wherein reading a display block alternates between reading one of the first plurality of display lines and one of the second plurality of display lines to output the display block as a non-interlaced video frame.

7. The method of claim 5, wherein reading a display block reads each one of the first plurality of display lines and then each one of the second plurality of display lines to output the display block as an interlaced video frame.

8. The method of claim 1, wherein a display block read from a buffer before at least one buffer is full is not output to the monitor.

9. The method of claim 1, wherein a read of a display block from a buffer is not performed until at least one buffer is full.

10. A method for improving the quality of full-motion video displayed on a video monitor controlled by display processing circuitry that converts frames in a video stream into a corresponding series of display blocks and stores the display blocks in a memory for display on the monitor, the method comprising the steps of:

partitioning the memory into three logical buffers, wherein each buffer is large enough to hold a display block and the buffers are arranged in a logical ring for access in a pre-determined sequence; and writing the series of display blocks into successive buffers while continuously displaying on the monitor an entire display block read from a buffer until the next display block in the series is completely written to the next buffer in the sequence so that only complete frames are displayed on the monitor.

11. A system for improving the quality of full-motion video displayed on a video monitor comprising:

display processing circuitry for converting frames in a video stream into corresponding series of display blocks for output on the monitor;

memory accessible by the display processing circuitry for temporarily storing the display blocks until output on the monitor;

initialization means in the display processing circuitry for partitioning the memory into three logical buffers each sized to hold a display block and arranging the buffers in a logical ring for access in a pre-determined sequence; and cyclical accessing means for writing the series of display blocks into successive buffers while continuously reading an entire display block from a buffer until the next display block in the series is completely written to the next buffer in the sequence so that only complete frames are output on the monitor.

12. A computer-readable medium having computer-executable instructions stored thereon for performing the steps recited in claim 1.

13. A computer-readable medium having computer-executable instructions stored thereon for performing the steps of:

partitioning a memory into three logical buffers, wherein each buffer is large enough to hold a display block that corresponds to a frame in a video stream and the buffers are arranged in a logical ring for access in a predetermines sequence; and writing a series of display blocks into successive buffers while continuously displaying on a monitor an entire display block read from a buffer until the next display block in the series is completely written to the next buffer in the sequence so that only complete frames of video data are displayed on the monitor and display blocks in the buffers are displayed in the order in which the corresponding frames appear in the video stream.

* * * * *